United States Patent [19]
Gell, Jr.

[11] Patent Number: 6,065,226
[45] Date of Patent: May 23, 2000

[54] COFFEE ROASTER FILTER, CHAFF COLLECTOR AND SMOKE REDUCER

[76] Inventor: Harold A Gell, Jr., 13720 Lockdale Rd., Silver Spring, Md. 20906-2117

[21] Appl. No.: 09/146,234

[22] Filed: Sep. 3, 1998

[51] Int. Cl.[7] .................................................. G01D 21/00
[52] U.S. Cl. .................. 34/594; 34/549; 34/576; 34/606; 99/286; 99/483; 219/502; 426/467
[58] Field of Search .......................... 34/360, 368, 394, 34/494, 549, 564, 576, 594, 606; 99/285, 286, 469, 476, 483; 219/502, 400; 426/466, 467

[56] References Cited

U.S. PATENT DOCUMENTS

| | | | |
|---|---|---|---|
| 4,631,838 | 12/1986 | Eichler et al. | 34/57 A |
| 4,683,666 | 8/1987 | Igusa et al. | 34/67 |
| 5,359,788 | 11/1994 | Gell, Jr. | 34/360 |
| 5,500,237 | 3/1996 | Gell, Jr. et al. | 426/466 |
| 5,749,288 | 5/1998 | Skaling | 99/483 |

*Primary Examiner*—Henry A. Bennett
*Assistant Examiner*—Pamela A. Wilson
*Attorney, Agent, or Firm*—Harold Gell

[57] ABSTRACT

An exhaust particle and particulate containment system for a coffee roaster comprises a filter chamber for exhaust coffee roasting by-products including chaff and smoke particulates and oils is comprised of a screen for separating chaff from the exhaust coffee roasting by-product effluent and a filter for containing chaff and removing smoke particulates and oils when the screen is in a closed position.

21 Claims, 2 Drawing Sheets

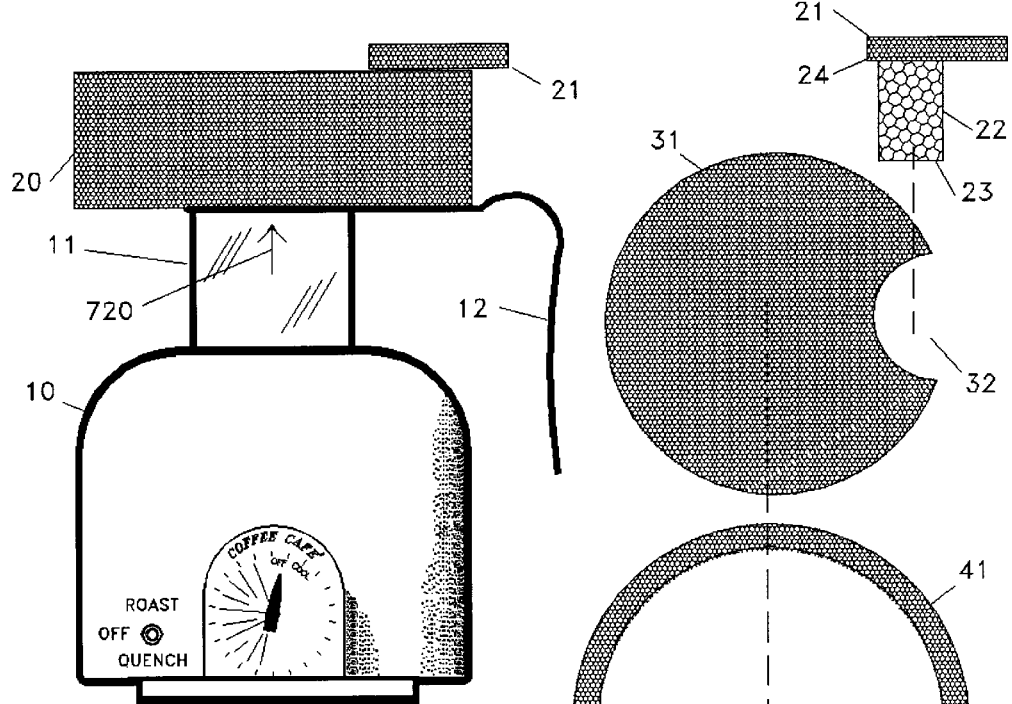
Fig. 1
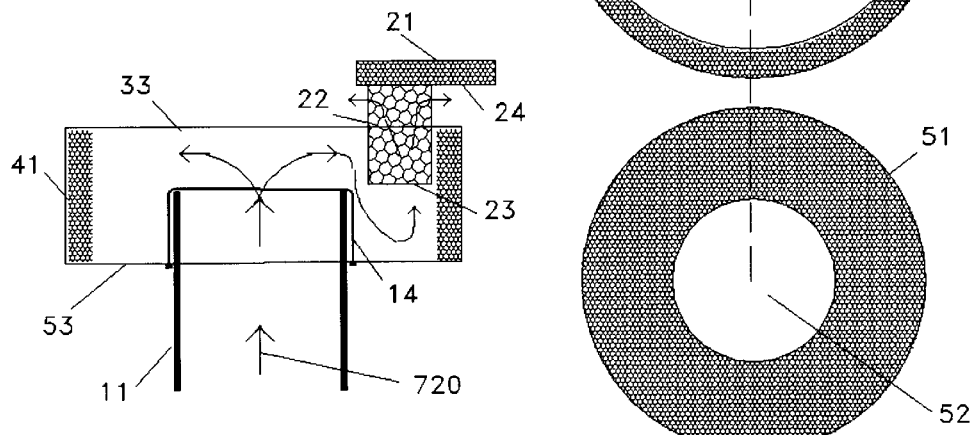
Fig. 2
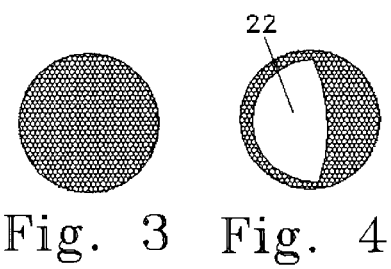
Fig. 3  Fig. 4
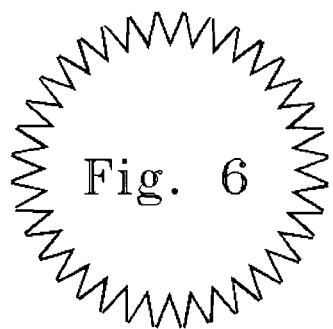
Fig. 5
Fig. 6

COFFEE ROASTER FILTER, CHAFF COLLECTOR AND SMOKE REDUCER

FIELD OF THE INVENTION

This invention relates to a means and apparatus for separating chaff, eliminating or reducing smoke and venting waste gases generated during a coffee roasting process.

BACKGROUND OF THE INVENTION

Coffee, a beverage brewed from ground, roasted beans of the botanical species coffee originated in a part of the world now known as Ethiopia where wild Arabica trees were harvested to obtain the bean concealing cherries. The use of coffee as a beverage gradually spread from Ethiopia to include all of what was considered the civilized world by the early 17th century. Its popularity spread throughout the world in unison with mans advancement in global navigation. By the early 18th century the demand for coffee outstripped the ability of the native Arabica trees and plantations sprung up around the world in every country having a climate hospitable to the Arabica tree. Today, a coffee belt girdling the globe provides a great variety of cafes having regional qualities which attempt to meet the varied taste of the world population.

The characteristic flavor of coffee is affected not only by the point of origin and quality of the bean but also by the processing and roasting of the coffee bean. This provides an infinite variety of flavor characteristics which are further expanded by blending various varietal cafes and by brewing techniques.

The infinite variety afforded by coffee as a beverage is unfortunately a potential which has not been tapped except in a minimal way due to problems in marketing. The flavor of coffee is developed by roasting which causes the chemical reaction of pyrolysis within the beans that develops the coffee oils which create the essence and flavor of coffee. At the present time there is no easy, repeatable way to roast coffee in the home, therefore coffee is purchased preroasted and generally preground. This eliminates the possibility of individuals adjusting the coffee to suit their tastes in that they must be satisfied with products provided by commercial coffee roasters.

The fact that most coffee is sold preground or at least preroasted is an unfortunate circumstance. Coffee begins losing its flavor as soon as it is roasted. Ground coffee loses a significant amount of flavor within hours of being ground while roast coffee stored as whole beans will maintain its flavor reasonably well for approximately one week if sealed in an air tight container to minimize oxidation of the oils. Thus the coffee industry has what appears to be an unlimited variety of flavors that it can offer the public but due to marketing logistics, only a small segment of the potential may be tapped. Conversely, green coffee may be kept for years with little effect on its flavor content other than a mellowing such as is found in the aging of a fine wine.

Ideally then, the coffee industry should market its product as green coffee beans so that the individual consumer may blend and roast beans to meet his desires. Unfortunately, no satisfactory roasting device is available for the individual consumer whereby a small quantity of coffee for a single serving or single pot may be roasted.

A few coffee devotees manage to roast beans in iron skillets but this is a difficult task in that the skillet must be heated to a predetermined temperature and the beans introduced into the heated skillet which must be covered to maintain heat. The beans are agitated to ensure that they do not burn and when they have reached the proper degree of pyrolysis, the roasting must be quenched by dumping the beans onto a cool surface. At best, this method results in a product wherein the individual beans are each roasted to a different degree of roast, ranging anywhere from a light cinnamon roast to a heavy roast in a single batch.

Some improvements have been made to the pan roasting methods wherein a stirring device is fitted in the pan cover so that a person may continually stir the coffee in the pan while the cover is tightly maintained to ensure that the heat remains within the pan. This results in beans of a more uniform roast but the end product is still far from acceptable.

Pan roasting techniques for home use have a further disadvantage. In addition to the inconsistent degree of roasting achieved, the chaff coating of the coffee beans is loosened but not separated from the beans. Therefore, this undesirable part of the coffee bean remains with the beans and can only be separated by a winnowing technique. Furthermore the chaff tends to burn during the pan roasting process and results in a considerable amount of pungent smoke.

One attempt has been made to improve home roasting methods through the use of modern technology. This device is comprised of a hand-held hair dryer like device with a metal funnel over the hot air exhaust. The green beans are placed in the funnel and as the heated air passes through the beans, the operator gently tosses the beans within the funnel by up and down movement of the device. This particular home roaster is impractical for more than an ounce of beans at a time and the operator must continually shake the device which becomes very fatiguing. Also, the chaff associated with the beans is blown around the kitchen or area where the roasting is accomplished.

The early hand-held hair dryer type hot air coffee roasters were improved by devices such as J. Murray's coffee roaster patent, U.S. Pat. No. 4,484,064 and M. Sivetz's coffee roasting system, U.S. Pat. No. 3,964,175. Both of the foregoing devices levitated a charge of green coffee beans in a heated air stream. They relied on an oven chamber which grew progressively larger from the bottom to the top so that the velocity of heated air diminished as the volume increased with the expansion of the dimensions of the oven chamber. This results in a fluidized bed where the beans are levitated by the high velocity air and carried upward but as the velocity of the air stream diminishes, the beans are allowed to fall back. Creating a fluidized bed in this fashion requires high air flow rates and as a result the system is extremely inefficient. In fact, roasters of this type require an excessively long roasting time due to the cooling effect of the upwelling heated air as it expands into the increased volume of the upper oven chamber. The end result of this deficiency in design is that the beans are dried and become stale in the roasting process.

The shortcomings of the prior coffee roasting systems utilizing a fluidized bed created by a flared chamber have been eliminated by the use of a horizontally rotating fluidized bed as described in U.S. Pat. Nos. 4,494,314 and 5,359,788 for "Coffee Roaster" issued to Harold Gell. With the advent of horizontally rotating fluidized bed applications to coffee roaster technology, the problems involving the actual roasting technique have been solved. However, a problems remain with respect to collection of the chaff and elimination of smoke particulates and oils generated during the roasting process.

OBJECTIVES OF THE INVENTION

In view of the obvious inability of prior techniques to tap the full potential of flavors available in the various cafes produced throughout the world by providing a relatively easy method of home roasting, it is a primary objective of the present invention to provide a device with which an individual consumer may roast a small amount of coffee to a predetermined degree of pyrolysis, cellulose carbonization and caramelization without creating offensive smoke.

To avoid the shortcomings in the prior art coffee roasters, it is a primary objective of this invention to provide a chaff collector/trap and smoke particle and oil filter for waste gasses and smoke generated during the roasting process.

It is a further objective of the present invention to provide a chaff trap and smoke eliminator or reducer that may be removed and replaced from the top of a coffee roaster oven chamber.

A further objective of the invention is to provide a removable chaff collecting means at the exhaust end of the exhaust duct of a coffee roaster.

A still further objective of the present invention is to provide a removable and replaceable exhaust filter for gasses and smoke generated during pyrolysis with an adjustable bypass incorporating a chaff collector for reducing back pressure and thereby controlling the angular velocity of the fluidized bed.

A further objective of the present invention is to provide a home coffee roasting device which removes chaff from coffee beans and traps the chaff on a collecting surface to prevent chaff contamination of the environment.

A still further objective is to provide an exhaust particle, particulate and oil filter for a fluidized bed coffee roaster.

The foregoing and other objectives of the invention will become apparent in light of the drawings, specification and claims contained herein.

SUMMARY OF THE INVENTION

A combined chaff collector, smoke reducer and rotating bed velocity control for a coffee roaster is presented in the form of an exhaust particle, particulate and oil filter. The coffee roasting method and apparatus used in preferred embodiments of the invention are similar to those systems described in U.S. Pat. Nos. 4,494,314; 5,359,788; and 5,500,237 which are incorporated herein by reference.

The essence of the invention is an exhaust filter fabricated from a porous medium, such as a non-woven fabric mat, for collecting large particulate matter such as chaff and eliminating or reducing oil and smoke particulates from the effluent created during a coffee roasting process. In one embodiment, a drum shaped filter chamber is fabricated from a non-woven fabric material of sufficient thickness and rigidity to maintain a desired shape and a high temperature tolerance to withstand the heat generated during coffee roasting. An opening dimensioned to provide a tight but slidable fit over the exhaust duct or open end of the coffee roaster oven chamber is provided in the bottom of the filter drum. The top of the filter drum is provided with a controllable opening adjacent to its outer edge. This opening receives a chaff collector/fluidized bed control device which is a tube that is open at the bottom end and closed at the top by a plug of the material forming the drum. The tube and plug are shaped to fit snugly but easily slide into the opening in the top of the filter drum. The length of the tube is dimensioned relative to the height of the filter drum so that it may be slid into the drum to a depth which causes the plug to seal the opening in the top of the drum or sild partially out of the drum to control back pressure and collect chaff within the tube. The chaff collector/fluidized bed control device is removed to empty it of chaff and provide an opening in the top of the filter drum from which excess chaff collected in the drum may be dumped.

In the preferred embodiment, the top of the filter drum is hinged at one point along its edge to the side wall of the filter drum. A screen skirt descends from the outer edge of top into the interior of the filter drum. The screen skirt is dimensioned to fill the gap between the top and filter drum wall when the top is partially raised to provide a chaff collecting surface and control back pressure. When this version of the chaff collector/fluidized bed control device is rotated upwards a further distance, the screen skirt is raised partially out of the confines of the filter drum wall to provide an opening through which collected chaff may be dumped. Smoke particulate and oil elimination or reduction is provided by a filter fabricated from a material which is not affected by the high temperature of the exhaust gasses. A high-efficiency, particulate, air filter (HEPA) is preferred. The filter must have a surface area large enough so as not to impede air flow through the system to such an extent that the fluidized bed is markedly affected or terminated but may be controlled by the chaff collector/fluidized bed control device. This is accomplished in the preferred embodiment by creating the filter drum wall, top and bottom from the filter material.

DESCRIPTION OF THE DRAWINGS

FIG. 1 illustrates the filter system installed on a typical, counter-top coffee roaster.

FIG. 2 is a cut-away view of the filter installed on an upper oven chamber, vertically bisecting the filter and oven chamber.

FIG. 3 is a top view of the air flow control valve and chaff collector.

FIG. 4 is a bottom view of the air flow control valve and chaff collector.

FIG. 5 is an exploded view of the filter drum components of the coffee roaster chaff collector and smoke reducer comprising the invention.

FIG. 6 is a top view of an alternate embodiment of the filter drum side wall using accordion pleat technology to increase filter surface area.

DESCRIPTION OF THE INVENTION

Figure 7:
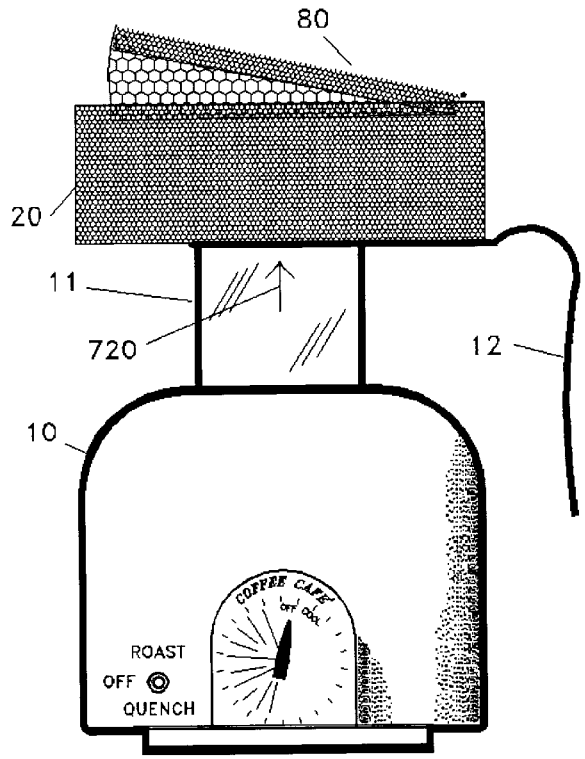
FIG. 7 illustrates a preferred embodiment of the filter system (filter chamber) installed on a typical counter-top coffee roaster.

FIG. 1 illustrates the coffee roaster filter, chaff collector and smoke reducer, filter chamber, 20 which comprises the present invention installed on the upper oven chamber 11 of a typical counter-top coffee roaster 10. The filter chamber 20 is positioned over the exhaust end of the oven chamber 11 by resting it on the portion of the oven chamber handle 12 which circles the oven chamber 11. Air flow 720 exhausted from coffee roaster passes up through the exhaust end of the oven chamber 11 and into the drum shaped body of the filter chamber 20. The air flow 720 may be seen more clearly in FIG. 2 which illustrates the air flow control valve and chaff collector 21 in a raised position to reduce back pressure and increase air flow while collecting chaff and in FIGS. 11 and 12 in an alternate embodiment. In FIG. 1, the air flow control valve and chaff collector 21 is in the closed position, placing the filter system in a maximum smoke reduction mode.

The air flow control valve and chaff collector 21 is comprised of a screen 22 for collecting chaff when the valve is in a raised position. The screen 22 has a tubular shape as can be see in FIGS. 2, 4 and 5. It is open at the bottom 23 to admit chaff and closed at the top by a disk 24 of filter material of the type used to fabricate the structural chamber of the filter body or a material which is not pervious to air flow. When the valve 21 is closed as illustrated in FIG. 1, the filter exhibits maximum resistance to air flow. All exhaust gases from the coffee roasting process are forced to exit through the filter media of the drum shaped body of filter chamber. This media is a non-woven polyester fabric, which in a preferred embodiment, is of a thickness and rigidity whereby the bottom, side walls and top are self supporting. It traps the oily smoke particles produced during coffee roasting as well as particulate matter which would passed through the screen 22 of the valve 21. In FIG. 2 the valve 21 is raised to allow air flow 720 to pass through the portions of the screen 22 which are above the top of the filter chamber. By sliding the valve assembly 21 up and down in the opening 32 in the top of the filter chamber, the air flow 720 through the coffee roaster may be controlled to regulate the angular velocity of the rotating fluidized bed. The opening 32 in the top 31 of the filter assembly provides a convenient means to dump chaff from the filter assembly when the air flow control valve and chaff collector 21 is removed. After each roasting cycle, the valve 21 should be removed from the assembly and emptied by shaking out the chaff collected in the screen tube 22.

The filter chamber assembly 20 is placed over the exhaust end of the oven chamber 11 and positioned so that the air flow 720 may exit the oven chamber and circulate within the chamber of the filter assembly 20 as best seen in FIG. 2. The filter assembly 20 includes a wire framework 14 which positions the filter chamber in the optimum position to insure maximum circulation of exhaust oven gases within the filter for best filtration and chaff collection. The wire framework 14 is an alternate embodiment to the preferred embodiment illustrated in FIG. 1 where the filter assembly 20 is positioned by resting it on the removable oven chamber handle, 12, attachment means.

The primary filtration body filter assembly 20 is in the form of a drum fabricated from filter material which preferably has HEPA qualities to maximize smoke elimination. In a preferred embodiment the material is a ¼ inch thick, non-woven mat of polyester fibers which are heat shrunk to provide increased rigidity for the structure as well as dimensional stability when subjected to the heat of the oven exhaust. FIG. 5 illustrates the components forming the filter assembly arranged in an exploded view. The chamber wall 41 is fabricated from the selected filter material which, in alternate embodiments, may be an accordion pleated material to provide increased surface area to permit the use of a filtration material having an increased air flow resistance due to its increased efficiency in trapping microscopic particles such as found in HEPA filters. An example of a chamber wall fabricated from accordion pleated material is illustrated in FIG. 6. In this alternate embodiment, the chamber top and bottom, 31 and 32 of FIG. 5, may be fabricated from a nonwoven filter material or an air flow impervious material such as a metal or high temperature plastic solid as in top 33 and bottom 53 of FIG. 2. However, nonwoven material provides superior sealing between the oven chamber exhaust 11 and chamber bottom 51 as well as between the air flow control valve and chaff collector 21 and opening 32 in the top of the filter chamber.

In the exploded view of filter system in FIG. 5, the air flow control valve and chaff collector is positioned over the opening 32 in the top 31. To visualize its insertion into the opening 32, assume it is rotated out of the drawing toward the viewer by 90 degrees and slid down the dashed line. The top 31 moves down its dashed line until it is centered over the chamber wall 41. It is secured within the chamber wall so its top is flush with the wall. This assembly moves down over the bottom 51. The bottom 51 may fit within the circular wall 41 or it may have a diameter equal to the outside diameter of the wall.

The bottom, 51, includes an opening 52 which is dimension to slip over the exhaust end of the oven chamber 11. The use of a nonwoven fiber filter for the bottom section 51 insures a close fit between the opening 52 and the oven chamber. The chamber wall 41 is dimensioned to mate with the bottom 51 and top 31. The three pieces, 31, 41 and 51, are bonded together to complete the basic structural chamber of filter assembly 20. However, it is preferred that the top 31 fit within the circular wall 41 to simplify cutting of the material forming the top and provide a smooth exit for dumping excess chaff collected within the filter chamber through the opening 32 when the air flow control valve and chaff collector 21 is removed.

FIG. 7 illustrates a typical counter-top coffee roaster with the preferred embodiment of the filter assembly installed on the upper section, 11, of an oven chamber. In this embodiment, the top assembly 80 functions as an air flow control valve and chaff collector and the handle 12 of the upper oven chamber 11 supports the filter assembly 20.

The filter chamber is comprised of a circular side wall 41 and bottom 51 as illustrated in FIG. 5. These components are fabricated from a smoke and oil filtration medium such as a nonwoven fiber mat of approximately ¼ inch thickness and a density capable of removing microscopic smoke particles and trapping oils.

Figure 8:
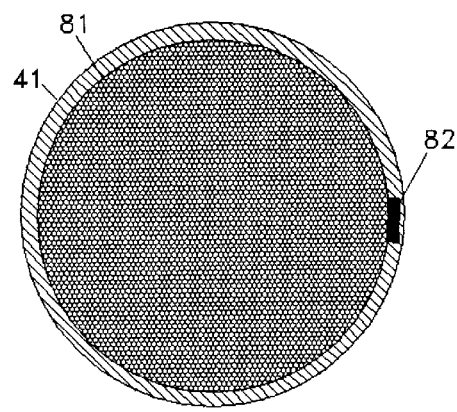
FIG. 8 is a top view of the preferred embodiment of the filter system.

The top, 80, of the preferred filter chamber 20 is fabricated from a disk 81 of the same material as the sides and bottom. It incorporates a hinge 82 which secures it to the wall 41 of the filter chamber 20 as illustrated in FIG. 8.

Figure 9:
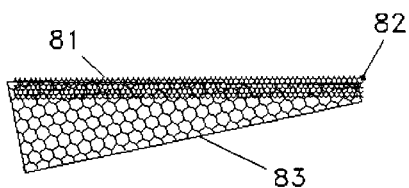
FIG. 9 is a side view of the top of the preferred embodiment of the filter system.
Figure 10:
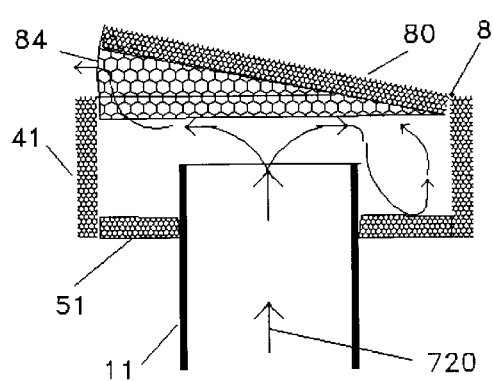
FIG. 10 is a sectional do taken vertically along the center of the filter chamber with the top partially open in the normal chaff collection, back pressure reducing configuration.

The top 80 includes a fine mesh screen skirt, 83 of FIG. 9, which encircles the top filter disk 81. The screen, 83, functions as a chaff collector when the chaff collector/smoke eliminator is in the chaff collecting mode as illustrated in FIGS. 7 and 10. When the system is in the chaff collecting mode, only a wedge shaped section is above the filter wall 41 as illustrated in FIG. 10. Therefore, the screen has an angled bottom to conserve material. The end of the screen skirt opposite the hinge 82 arcs inward from the top to the bottom with a curve calculated to ensure that chaff cannot escape through the space between the skirt and chamber wall when positioned as illustrated in FIG. 10.

Figure 11:
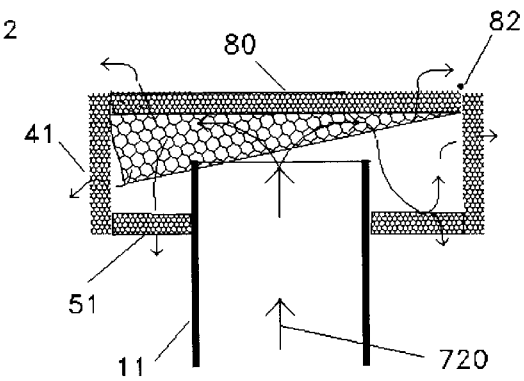
FIG. 11 is a sectional view taken vertically along the center of the filter chamber with the top closed to provide maximum filtration for removing smoke particulates and oils.

With the top, 80, of the filter closed, as illustrated in FIG. 11, the exhaust gases and smoke particulates and oils 720, which are the by-products of coffee roasting, are forced through the filter material comprising the bottom 51, side 41, and top 81 of the filter 20. In this configuration, a maximum amount of spoke particulates and oils are removed. The efficiency of filter material is selected to provide optimum performance of the counter-top coffee roaster and optimum smoke filtration. As can be seen in FIGS. 10 and 11, a curved or wedge shaped configuration of the fine mesh screen skirt 83 is necessary to keep the section of the skirt opposite the hinge 82 from interfering with the side wall 41 when the top is opened and closed.

In the preferred embodiment illustrated by FIGS. 7 through 12, the air flow from the coffee roaster oven chamber is up through the glass upper oven chamber 11 and into the interior of the filter chamber 20. It exits the filter chamber 20 in the normal chaff collecting mode via an exposed section, 84, of the screen 83, see FIG. 10. When in the smoke filtration mode, illustrated by FIG. 11, the exhausting gases pass through the filter media forming the sides, 41, bottom, 51, and top, 80.

Figure 12:
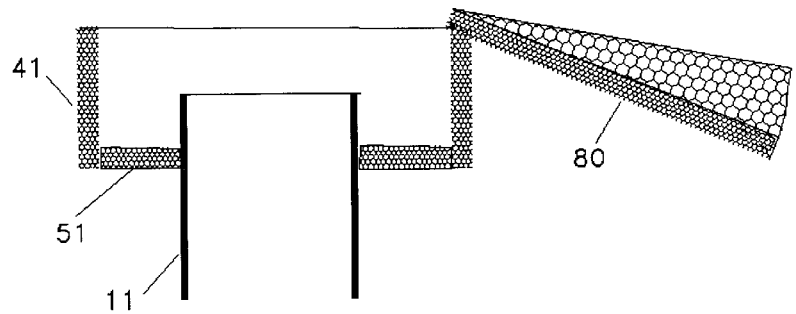
FIG. 12 is a sectional view taken vertically along the center of the filter chamber with the top open to facilitate chaff removal.

Chaff is removed from the filter chamber 20 by swinging the top 80 up and to the side, as illustrated by FIG. 12, and dumping the contents of the filter chamber.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A chaff collection and smoke particulate and oil containment system for a coffee roaster, comprising:
   a chamber including an inlet and a porous structure for filtering smoke particulates and oil from an effluent discharge of a coffee roaster;
   an opening in said chamber;
   a closure for sealing said opening; and
   a collecting means for chaff carried by said effluent discharge passing through said chamber and out said opening when said closure is removed from said opening.

2. A chaff collection and smoke particulate and oil containment system for a coffee roaster, as defined by claim 1, wherein said collecting means is secured to said closure and dimensioned to span a space between said closure and said opening when said closure is removed from said opening whereby said effluent discharge carrying chaff passes through said collecting means after passing through said opening.

3. A chaff collection and smoke particulate and oil containment system for a coffee roaster, as defined by claim 2, wherein said porous structure includes an accordion pleated HEPA filter medium comprising a side wall of said chamber.

4. A chaff collection and smoke particulate and oil containment system for a coffee roaster, as defined by claim 3, wherein said chamber includes a bottom incorporating said inlet and a top incorporating said opening and said bottom and said top are fabricated from a non-woven filter medium of a thickness and rigidity whereby said bottom and said top are self supporting and comprise elements of said porous structure.

5. A chaff collection and smoke particulate and oil containment system for a coffee roaster, as defined by claim 2, wherein said porous structure is fabricated from a non-woven filter medium comprising a side wall of said chamber having a thickness and rigidity whereby said side wall is self supporting.

6. A chaff collection and smoke particulate and oil containment system for a coffee roaster, as defined by claim 5, wherein said chamber includes a bottom incorporating said inlet and a top incorporating said opening and said bottom and said top are fabricated from a non-woven filter medium of a thickness and rigidity whereby said bottom and said top are self supporting and comprise elements of said porous structure.

7. A chaff collection and smoke particulate and oil containment system for a coffee roaster, as defined by claim 2, wherein said chamber includes a bottom incorporating said inlet and a top incorporating said opening and said bottom and said top comprise said porous structure and are fabricated from a non-woven filter medium of a thickness and rigidity whereby said bottom and said top are self supporting.

8. A chaff collection and smoke particulate and oil containment system for a coffee roaster, as defined by claim 2, wherein said collecting means is a screen.

9. A chaff collection and smoke particulate and oil containment system for a coffee roaster, as defined by claim 2, where in said opening comprises a chaff discharge port when said collecting means is removed from said opening.

10. A chaff collection and smoke particulate and oil containment system for a coffee roaster, as defined by claim 1, where in said closure comprises a means for regulating a flow rate of said effluent discharge and there by regulate the angular velocity of a fluidized bed of roasting coffee creating said effluent discharge.

11. A chaff collection and smoke particulate and oil containment system for a coffee roaster, comprising:
    a chamber including a porous structure for filtering smoke particulates and oil from an effluent discharge of a coffee roaster;
    said chamber including an inlet for receiving said effluent discharge of a coffee roaster;
    an opening in said chamber;
    a closure for sealing said opening; and
    a collecting means for chaff carried by said effluent discharge passing from said inlet through said chamber.

12. A chaff collection and smoke particulate and oil containment system for a coffee roaster, as defined by claim 11, including a screen secured to said closure and dimensioned to span the space between said closure and said opening when said closure is removed less than a predetermined distance from said opening whereby said effluent discharge passes through said screen as it passes through said opening.

13. A chaff collection and smoke particulate and oil containment system for a coffee roaster, as defined by claim 12, wherein said porous structure includes an accordion pleated HEPA filter medium comprising a side wall of said chamber.

14. A chaff collection and smoke particulate and oil containment system for a coffee roaster, as defined by claim 13, wherein said chamber includes a bottom incorporating said inlet and a top incorporating said opening and said bottom and said top are fabricated from a non-woven filter medium of a thickness and rigidity whereby said bottom and said top are self supporting and comprise elements of said porous structure.

15. A chaff collection and smoke particulate and oil containment system for a coffee roaster, as defined by claim 12, wherein said porous structure is fabricated from a non-woven filter medium comprising a side wall of said chamber having a thickness and rigidity whereby said side wall is self supporting.

16. A chaff collection and smoke particulate and oil containment system for a coffee roaster, as defined by claim 14, wherein said chamber includes a bottom incorporating said inlet and a top incorporating said opening and said bottom and said top are fabricated from a non-woven filter medium of a thickness and rigidity whereby said bottom and said top are self supporting and comprise elements of said porous structure.

17. A chaff collection and smoke particulate and oil containment system for a coffee roaster, as defined by claim 12, wherein said chamber includes a bottom incorporating said inlet and a top incorporating said opening and said bottom and said top comprise said porous structure and are fabricated from a non-woven filter medium of a thickness and rigidity whereby said bottom and said top are self supporting.

18. A filter for a coffee roaster, as defined by claim 12, wherein said collecting means is a screen.

19. A chaff collection and smoke particulate and oil containment system for a coffee roaster, as defined by claim 12, where in said opening comprises a chaff discharge port when said collecting means is removed by more than said predetermined distance from said opening.

20. A chaff collection and smoke particulate and oil containment system for a coffee roaster, as defined by claim 11, wherein said coffee roaster is a rotating bed coffee roaster and said closure for sealing said opening includes means for partially blocking said opening whereby the angular velocity of a fluidized bed generated by said coffee roaster is controlled.

21. A chaff collection and smoke particulate and oil containment system for a coffee roaster, comprising:

means for collecting chaff stripped from roasting coffee beans comprising a chamber including a top and a bottom joined together by a side wall;

means in said bottom of said chamber for receiving an effluent by-product of coffee roasting; and said top, bottom and side wall of said chamber fabricated from a non-woven filter medium of a thickness and rigidity whereby said chamber is self supporting.

* * * * *